(12) United States Patent
Maki et al.

(10) Patent No.: US 11,482,912 B2
(45) Date of Patent: Oct. 25, 2022

(54) MANUFACTURING METHOD OF CORE FOR ROTARY ELECTRIC MACHINE

(71) Applicant: AISIN CORPORATION, Kariya (JP)

(72) Inventors: Masayuki Maki, Nisshin (JP); Tetsuya Matsubara, Okazaki (JP)

(73) Assignee: AISIN CORPORATION, Kariya (JP)

( * ) Notice: Subject to any disclaimer, the term of this patent is extended or adjusted under 35 U.S.C. 154(b) by 82 days.

(21) Appl. No.: 16/637,913

(22) PCT Filed: Sep. 28, 2018

(86) PCT No.: PCT/JP2018/036471
§ 371 (c)(1),
(2) Date: Feb. 10, 2020

(87) PCT Pub. No.: WO2019/066036
PCT Pub. Date: Apr. 4, 2019

(65) Prior Publication Data
US 2020/0220437 A1    Jul. 9, 2020

(30) Foreign Application Priority Data

Sep. 29, 2017 (JP) .............................. JP2017-190987

(51) Int. Cl.
| H02K 15/03 | (2006.01) |
| B21D 28/26 | (2006.01) |
| H02K 1/16 | (2006.01) |
| H02K 1/276 | (2022.01) |
| H02K 15/02 | (2006.01) |
| H02K 15/12 | (2006.01) |

(52) U.S. Cl.
CPC ............. *H02K 15/03* (2013.01); *B21D 28/26* (2013.01); *H02K 1/16* (2013.01); *H02K 1/165* (2013.01); *H02K 1/276* (2013.01); *H02K 15/024* (2013.01); *H02K 15/12* (2013.01)

(58) Field of Classification Search
CPC ...... B21D 28/22; B21D 28/26; H02K 15/024; H02K 15/03; H02K 15/12; H02K 1/16; H02K 1/165
See application file for complete search history.

(56) References Cited

U.S. PATENT DOCUMENTS

| 9,948,153 B2 * | 4/2018 | Izumi ................... H02K 1/2766 |
| 2014/0230236 A1 | 8/2014 | Hashimoto et al. |
| 2015/0244244 A1 | 8/2015 | Izumi |

(Continued)

FOREIGN PATENT DOCUMENTS

| JP | 2014-187862 A | 10/2014 |
| JP | 2015-173582 A | 10/2015 |

OTHER PUBLICATIONS

International Search Report for PCT/JP2018/036471 dated Jan. 8, 2019.

*Primary Examiner* — Minh N Trinh
(74) *Attorney, Agent, or Firm* — Sughrue Mion, PLLC

(57) ABSTRACT

A manufacturing method of a core for a rotary electric machine including forming a bridge portion, forming a stator side hole portion in at least a first portion of a portion of an electric steel plate in which a slot portion is formed. Then forming a rotor side hole portion in at least a part of a portion of the electric steel plate in which a hole portion is formed; and forming a rotor plate member and a stator plate member by blanking the electric steel plate.

20 Claims, 10 Drawing Sheets

(56) References Cited

U.S. PATENT DOCUMENTS

2015/0372571 A1* 12/2015 Hashimoto ............ H02K 15/03  
    156/264  
2020/0186015 A1* 6/2020 Maki ...................... H02K 1/165  
2020/0220437 A1* 7/2020 Maki ...................... H02K 1/165

* cited by examiner

MANUFACTURING METHOD OF CORE FOR ROTARY ELECTRIC MACHINE

CROSS REFERENCE TO RELATED APPLICATIONS

This application is a National Stage of International Application No. PCT/JP2018/036471 filed Sep. 28, 2018, claiming priority based on Japanese Patent Application No. 2017-190987 filed Sep. 29, 2017.

TECHNICAL FIELD

The disclosure relates to a manufacturing method of a core for a rotary electric machine.

BACKGROUND ART

Conventionally, a manufacturing method of a core for a rotary electric machine that has a rotor core formed by stacking a plurality of rotor plate members is known. Such a manufacturing method of a core for a rotary electric machine is disclosed in Japanese Unexamined Patent Application Publication No. 2015-173582 (JP 2015-173582 A), for example.

JP 2015-173582 A described above discloses a manufacturing method of a laminated core that is formed by stacking a plurality of core pieces. In the manufacturing method of a laminated core, a bridge is formed between a radial outer end of a magnet insertion hole of the core piece and an outer region of the core piece. Specifically, the magnet insertion hole is blanked from the core piece and a through hole that forms a radially outer side outline of the bridge is blanked. Blanking of the core piece is performed while avoiding the radially outer side outline of the bridge so as to form the core piece on the rotor side. The core pieces are stacked and the stacked core having the bridge on the outer periphery is manufactured.

RELATED ART DOCUMENTS

Patent Documents

Patent Document 1: Japanese Unexamined Patent Application Publication No. 2015-173582 (JP 2015-173582 A)

SUMMARY OF THE DISCLOSURE

Problem to be Solved by the Disclosure

Here, in order to simplify the manufacturing process and prevent an increase in materials, performing composite molding of a rotor plate member that configures a rotor core and a stator plate member that configures a stator core from the same electric steel plate (core piece) is conceivable. Applying the manufacturing method of performing composite molding of the rotor plate member and the stator plate member to the manufacturing method of a laminated core (rotor core) according to JP 2015-173582 A described above is conceivable. However, if the method of composite molding is applied to the manufacturing method of JP 2015-173582 A described above, the through hole for forming the bridge portion on the outer periphery of the rotor core is formed in the outer region of the core piece (region outward of the region in which the rotor core is formed). The through hole is thus formed in the region outward (radially outward) of the rotor core in which the stator core is formed. The region in which the through hole is formed and the region in which the stator core is formed is overlapped. Thus, it disadvantageously becomes difficult to form the stator core (perform composite molding of the rotor core and the stator core).

It is conceivable to form the through hole only at a position corresponding to an air gap between the rotor core and the stator core. However, the width of the air gap (radial width) is much smaller than the usual size that is blanked in the blanking step. The width of the punch thus needs to be configured to be smaller than the width of a typical punch. It is conceivable that ensuring the strength of the punch for forming the through hole is difficult when forming the through hole only at the position that corresponds to the air gap described above. Especially in this case, it is conceivable that ensuring the strength against eccentric load that acts to bend the punch, which results from bending moment acting on the punch, is difficult, since the sectional area of the punch has a thin plate shape. In the conventional manufacturing method of a core for a rotary electric machine, there is a problem that it is difficult to ensure the strength of the punch for press working while making it possible to perform composite molding of the stator plate member and the rotor plate member that has the bridge portion on the outer periphery from the same electric steel plate.

The various aspects of the disclosure been made in view of addressing the forgoing issue, and therefore has an aspect to provide a manufacturing method of a core for a rotary electric machine that can ensure the strength of a punch for forming a hole portion radially outward of the bridge portion while making it possible to perform composite molding of a stator plate member and a rotor plate member that has the bridge portion on the outer periphery from the same electric steel plate.

Means for Solving the Problem

In order to achieve the various aspects described above, a manufacturing method of a core for a rotary electric machine according to an aspect of the invention is a manufacturing method of a core for a rotary electric machine, the core provided with a rotor core that is formed by stacking a plurality of rotor plate members each having a hole portion, and a stator core that is formed by stacking a plurality of stator plate members each having a slot portion. The manufacturing method includes: a step of forming a bridge portion including a step of forming a stator side hole portion in at least a first portion of a portion of an electric steel plate in which the slot portion is formed, and a step of forming a rotor side hole portion in at least a part of a portion of the electric steel plate in which the hole portion is formed; and a step of forming the rotor plate member and the stator plate member by blanking the electric steel plate after the step of forming the bridge portion.

In the manufacturing method of a core for a rotary electric machine according to an aspect of the disclosure, the stator side hole portion (a through hole on the outer side of the bridge portion) is formed in at least the first portion of a portion of the electric steel plate in which the slot portion is formed, as described above. In this way, the width of the slot portion in the circumferential direction is larger than the width (radial width) of the air gap between the rotor core and the stator core. It is thus possible to form a stator side hole portion that has a large width (a large sectional area), compared to the case where the release hole is only formed at a position that corresponds to the air gap. Therefore, it is possible to ensure the strength of the punch (especially, the strength against eccentric load). As a result, it is possible to ensure the strength of the punch for blanking the stator side hole portion (a hole portion radially outward of the bridge portion) even when the bridge portion is formed on the outer periphery of the rotor plate member and when the composite molding is performed from the same electric steel plate as the stator plate member. In the invention, composite molding of the rotor plate member and the stator plate member from the same electric steel plate can be performed, since the rotor plate member and the stator plate member are formed by blanking the electric steel plate. As a result, it is possible to ensure the strength of the punch for forming the stator side hole portion (the hole portion radially outward of the bridge portion) while enabling composite molding of the stator plate member and the rotor plate member that has the bridge portion on the outer periphery. It is also possible to accurately form the bridge portion by providing the hole portion on both sides of the bridge portion in the radial direction.

Effects of the Disclosure

With the various aspects of the disclosure, it is possible to ensure the strength of the punch for forming the hole portion radially outward of the bridge portion while enabling composite molding of the stator plate member and the rotor plate member that has the bridge portion on the outer periphery.

BRIEF DESCRIPTION OF THE DRAWINGS

FIGS. 6A and 6B illustrate a configuration of a punch for forming a first radially outward release hole and a second radially outward release hole (FIG. 6A), a configuration of a punch for forming a first radially inward release hole and a second radially inward release hole (FIG. 6B), and a configuration of a punch for blanking the rotor plate member.

DETAILED DESCRIPTION

Embodiments of the disclosure will be described below with reference to the drawings.

First Embodiment (Structure of Rotary Electric Machine)

The structure of a rotary electric machine 100 according to a first embodiment will be described with reference to FIGS. 1 to 5.

Figure 1:
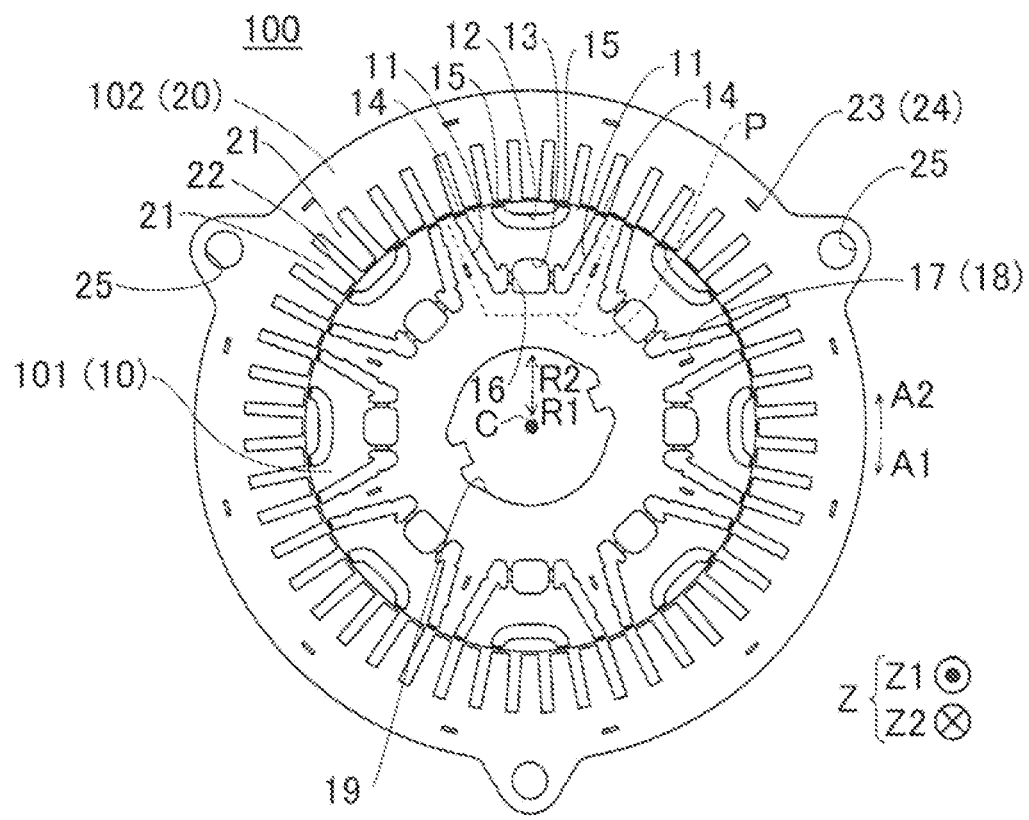
FIG. 1 is a plan view of a configuration of a rotor core and a stator core (rotary electric machine) according first to third embodiments of the disclosure invention.
Figure 2:
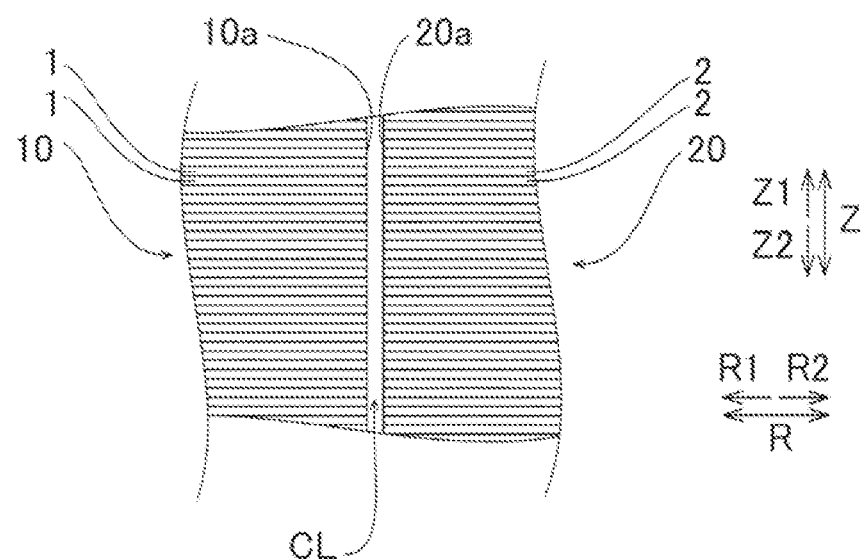
FIG. 2 is a diagram of a stack of the rotor plate members and the stator plate members according to the first to third embodiments of the disclosure.

As illustrated in FIG. 1, the rotary electric machine 100 has a rotor 101 and a stator 102. The rotor 101 includes a rotor core 10. The stator 102 includes a stator core 20. As illustrated in FIG. 2, the rotor core 10 is formed by stacking a plurality of rotor plate members 1. The stator core 20 is formed by stacking a plurality of stator plate members 2. The rotor core 10 and the stator core 20 are examples of a "core for a rotary electric machine" in the embodiments.

Here in the specification, a "stacking direction" means a stacking direction of the rotor plate members 1 of the rotor core 10 and the stator plate members 2 of the stator core 20 and means a Z direction. An "axial direction" means a direction along a rotational axis C of the rotor 101 and means the Z direction. A "radial direction" means a radial direction of the rotor 101 (an arrow R1 direction or an arrow R2 direction) and a "circumferential direction" means a circumferential direction of the rotor 101 (an arrow A1 direction or an arrow A2 direction).

The rotary electric machine 100 is configured as a motor, a generator, or a motor-generator. The rotor 101 is disposed radially inward of the stator 102 so as to face the stator 102 in the radial direction. That is, the rotary electric machine 100 is configured as an inner rotor-type rotary electric machine. As illustrated in FIG. 2, an outer peripheral surface 10a that is an end surface on a radially outer side of the rotor core 10 and an inner peripheral surface 20a that is an end surface on a radially inner side of the stator core 20 are disposed with a clearance CL (air gap) in between.

Figure 3:
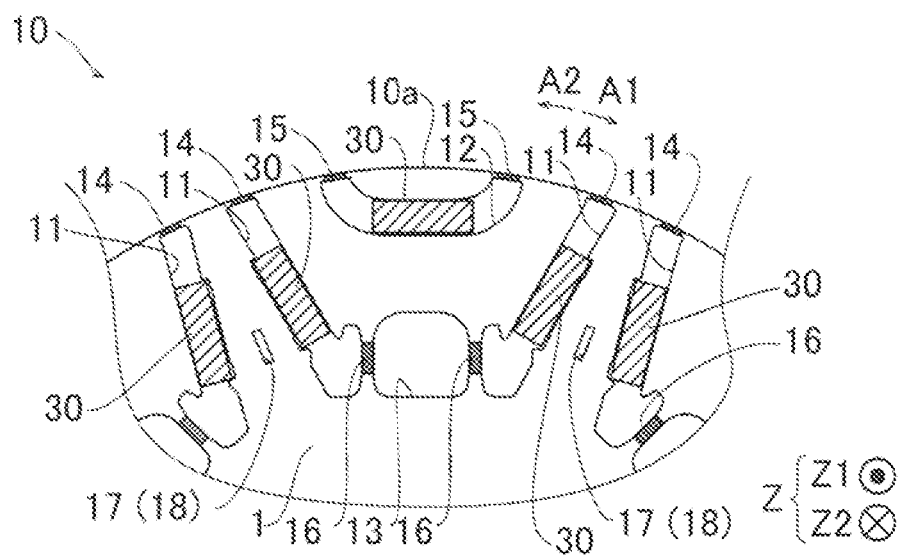
FIG. 3 is a partial plan view of the configuration of the rotor core (rotor) according to the first to third embodiments of the disclosure.

As illustrated in FIG. 3, the rotor core 10 has a plurality of first magnet hole portions 11 and a plurality of second magnet hole portions 12 each in which a permanent magnet 30 is disposed. That is, the rotary electric machine 100 of the first embodiment is configured as an interior permanent magnet motor (IPM motor). The rotor 101 is configured so as to transmit a rotating force to the outside the rotary electric machine 100 via a shaft (not shown) that is fixed to a shaft hole 19 on the radially inner side of the rotor 101. The first magnet hole portion 11 and the second magnet hole portion 12 are examples of a "hole portion" in the embodiments.

For example, two first magnet hole portions 11 and one second magnet hole portion 12 are provided for every pole P (see FIG. 1). The two first magnet hole portions 11 are disposed in a V shape (truncated chevron shape) that widens radially outward when viewed in the Z direction. The second magnet hole portion 12 is disposed between the first magnet hole portions 11 in the circumferential direction and radially outward of the first magnet hole portions 11 that are disposed in a V shape. In the rotor core 10, a magnetic flux anti-leak hole portion 13 is disposed between the two first magnet hole portions 11 in the circumferential direction.

A first flattened portion 14 is formed in a part (bridge part) between the first magnet hole portion 11 and the outer peripheral surface 10a. A second flattened portion 15 is formed in a part (bridge part) between the second magnet hole portion 12 and the outer peripheral surface 10a. A third flattened portion 16 is formed in a part (bridge part) between the first magnet hole portion 11 and the magnetic flux anti-leak hole portion 13. The first flattened portion 14, the second flattened portion 15, and the third flattened portion 16 are examples of a "bridge portion" in the embodiments.

Figure 4:
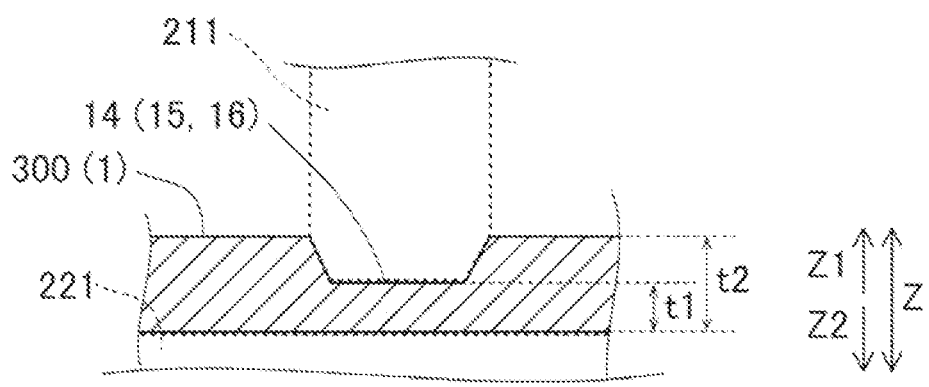
FIG. 4 is a diagram showing how a first flattened portion, a second flattened portion, and a third flattened portion are formed according to the first to third embodiments of the disclosure.

As illustrated in FIG. 4, a thickness t1 of the first flattened portion 14, the second flattened portion 15, and the third flattened portion 16 in the Z direction is thinner than a thickness t2 of the rotor plate member 1. In the first flattened portion 14, the second flattened portion 15, and the third flattened portion 16, magnetic resistance is larger than the other parts of the rotor plate member 1 and it is possible to reduce short circuit magnetic flux inside the pole P.

As illustrated in FIG. 3, a jump cut hole 17 and a clinch portion 18 are provided in the rotor core 10. The rotor plate members 1 are fixed to each other (are positioned) by causing the clinch portions 18 to be fitted to each other or by causing the jump cut hole 17 to be fitted to the clinch portion 18.

Figure 5:
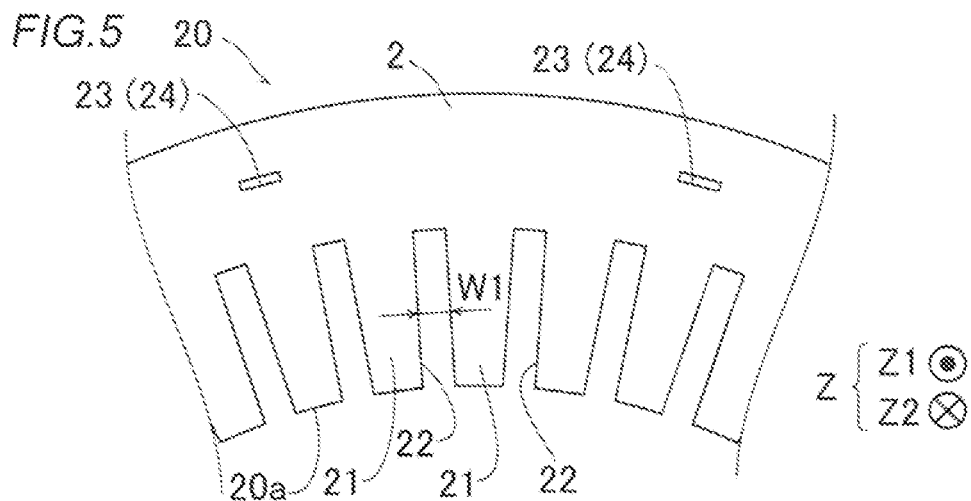
FIG. 5 is a partial plan view of the configuration of the stator core (stator) according to the first to third embodiments of the disclosure.

As illustrated in FIG. 5, the stator core 20 is provided with a plurality of teeth portions 21 that protrude in the radial direction toward the rotor core 10 side (radially inner side) and a slot portion 22 that is formed between the teeth portions 21 that are adjacent to each other. A coil (not shown) is disposed in the slot portion 22. For example, a width W1 of the slot portion 22 in the circumferential direction is set so as to be generally constant along the radial direction. In this way, the coil can be inserted in the slot portion 22 radially inwardly.

The stator core 20 is provided with a jump cut hole 23 and a clinch portion 24. The stator plate members 2 are fixed to each other (are positioned) by causing the clinch portions 24 to be fitted to each other or by causing the jump cut hole 23 to be fitted to the clinch portion 24. The stator core 20 is provided with an ear hole 25 (see FIG. 1).

As illustrated in FIG. 1, the first flattened portion 14 is disposed at a position that faces the slot portion 22 in the radial direction. The second flattened portion 15 is disposed at a position that faces the teeth portion 21 in the radial direction.

(Configuration of Device for Manufacturing Rotor Core and Stator Core)

Next, a press working device 200 (manufacturing device) for manufacturing the rotor core 10 and the stator core 20 according to the first embodiment will be described.

Figure 6A:
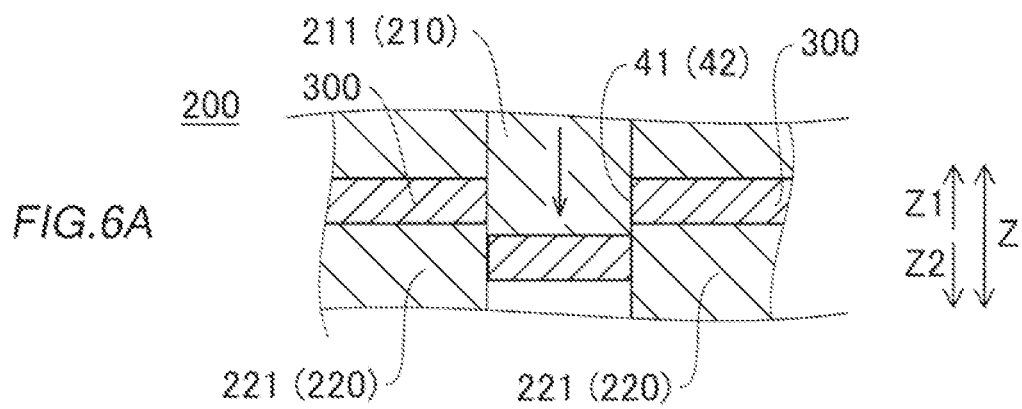
FIGS. 6A, 6B and 6C are partial schematic views of the configuration of the press working device according to the first to third embodiments.
Figure 6B:
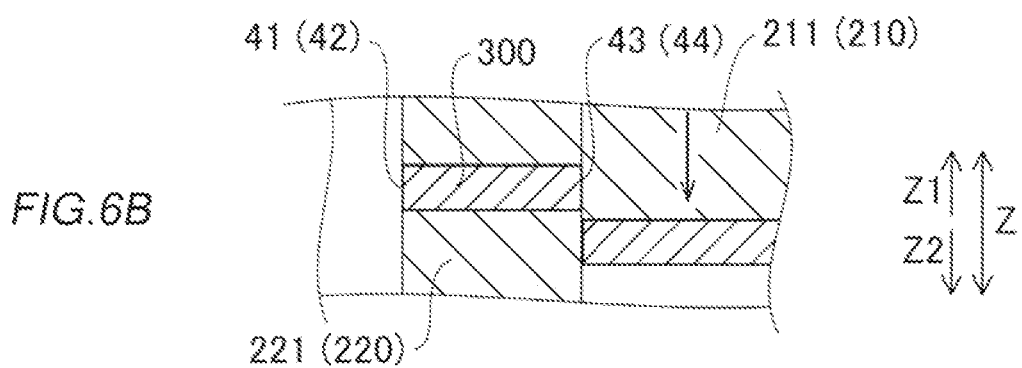
Figure 6C:
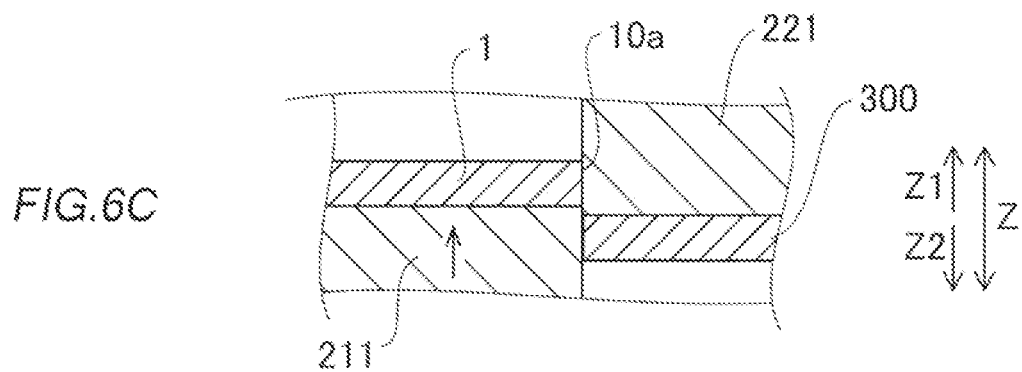

As illustrated in FIGS. 6A-6C, the press working device 200 is configured as a progressive press working device that performs press working while progressively moving the strip-shaped electric steel plate 300.

Specifically, the press working device 200 includes an upper die set 210 and a lower die set 220. The press working device 200 is configured so as to convey the electric steel plate 300 in an arrow X2 direction with a feeding mechanism while the strip-shaped electric steel plate 300 is disposed between the upper die set 210 and the lower die set 220.

A plurality of punches 211 and a plurality of dies 221 are provided on the upper die set 210 and the lower die set 220 of the press working device 200. The press working device 200 is configured to move the upper die set 210 in an up-down direction (Z direction) with respect to the lower die set 220 so as to sandwich the electric steel plate 300 between the punches 211 and the dies 221, and perform blanking work, flattening work, protruding portion-forming (dowel-forming) work etc. In FIG. 6A-6C, only some of the punches 211 and the dies 221 of the press working device 200 are shown. However, the punches 211 and the dies 221 are provided for every step described below and shapes of the punches 211 and the dies 221 are compatible with the steps.

For example, as illustrated in FIG. 4, the press working device 200 is configured so as to form the first flattened portion 14, the second flattened portion 15, and the third flattened portion 16 by performing coining work with the punches 211 and the dies 221.

As illustrated in FIG. 6A, the press working device 200 moves the punch 211 in an arrow Z2 direction so as to blank the electric steel plate 300 in the arrow Z2 direction. In this way, the press working device 200 shears the electric steel plate 300 in the arrow Z2 direction so as to form the first radially outward release hole 41 and the second radially outward release hole 42. The arrow Z2 direction is an example of a "first direction" in the claims.

As illustrated in FIG. 6B, the press working device 200 moves the punch 211 in the arrow Z2 direction so as to blank the electric steel plate 300 in the arrow Z2 direction. In this way, the press working device 200 shears the electric steel plate 300 in the arrow Z2 direction so as to form the first radially inward release hole 43 and the second radially inward release hole 44.

As illustrated in FIG. 6C, the press working device 200 moves the punch 211 in the arrow Z1 direction so as to blank the electric steel plate 300 in the arrow Z1 direction. In this way, the press working device 200 shears the rotor plate member 1 in the arrow Z2 direction so as to form the rotor plate member 1. The arrow Z1 direction is an example of a "second direction" in the claims embodiments.

(Manufacturing Method of Rotor Core and Stator Core)

Next, the manufacturing method of the rotor core 10 and the stator core 20 will be described. In the first embodiment, the manufacturing method of the rotor core 10 that is formed by stacking the rotor plate members 1 each having the first magnet hole portion 11 and the second magnet hole portion 12, and the stator core 20 that is formed by stacking the stator plate members 2 each having the slot portion 22 will be described.

The following manufacturing steps (steps S1 to S12) are carried out by the press working device 200 (see FIGS. 6A-6C). The electric steel plate 300 is delivered in one direction and the electric steel plate 300 is then sandwiched (pressed) by the punches 211 and the dies 221 so as to be processed.

Figure 7:
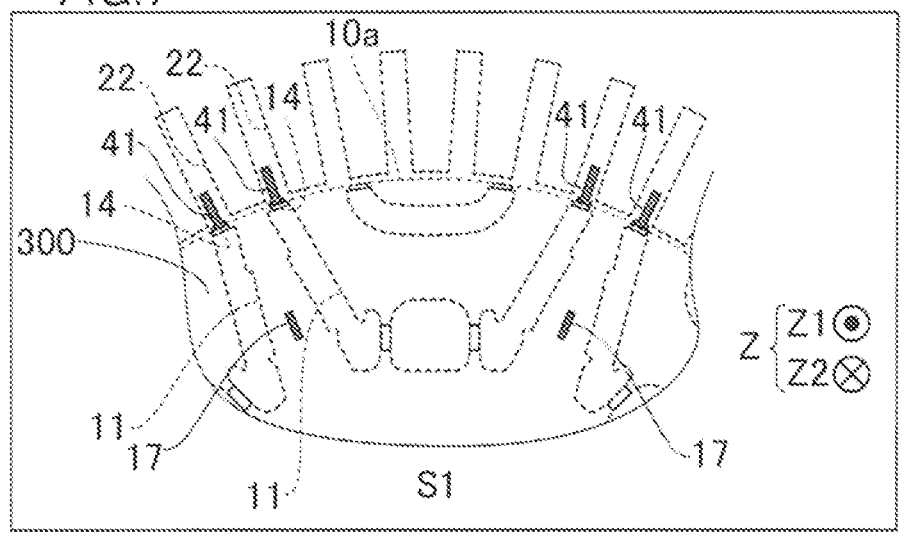
FIG. 7 illustrates a step of forming the first radially outward release hole according to the first embodiment of the disclosure.

As illustrated in FIG. 7, in step S1, a first radially outward release hole 41, the jump cut hole 17, and a pilot hole (not shown) are punched from the electric steel plate 300 at the same time. Specifically, in the first embodiment, the punch 211 is moved in the arrow Z2 direction so as to blank the electric steel plate 300 in the arrow Z2 direction, as illustrated in FIG. 6A. In this way, the electric steel plate 300 is sheared in the arrow Z2 direction so as to form the first radially outward release hole 41.

Figure 8:
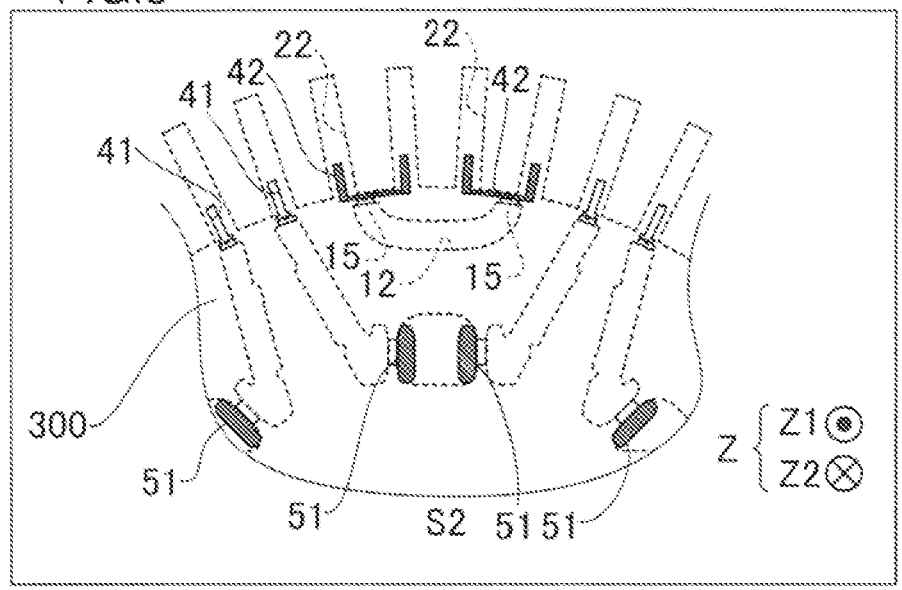
FIG. 8 illustrates a step of forming the second radially outward release hole according to the first embodiment of the disclosure.

As illustrated in FIG. 8, in step S2, the second radially outward release hole 42 and the center bridge one side release hole 51 are blanked from the electric steel plate 300 at the same time. Specifically, in the first embodiment, the punch 211 is moved in the arrow Z2 direction so as to blank the electric steel plate 300 in the arrow Z2 direction, as illustrated in FIG. 6A. In this way, the electric steel plate 300 is sheared in the arrow Z2 direction so as to form the second radially outward release hole 42. The first radially outward release hole 41 and the second radially outward release hole 42 are examples of a "stator side hole portion" in the claims. In FIGS. 7 to 22, parts that are hatched indicate parts that are processed in the illustrated step and parts that are not hatched indicate parts that have already been processed. Solid lines indicate parts that have been processed and dotted lines indicate parts that are scheduled to be processed (parts that will be processed in later steps).

Figure 9A:
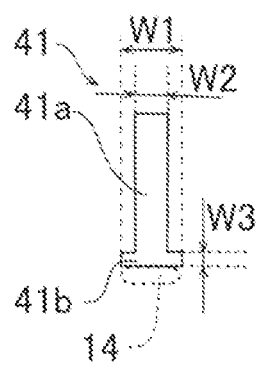
FIGS. 9A and 9B illustrate a configuration of the first radially outward release hole (FIG. 9A) and the second radially outward release hole (FIG. 9B) according to the first embodiment of the disclosure.

Here, as illustrated in FIG. 7, in the first embodiment, at least a first portion 41a of a part of the electric steel plate 300 in which the slot portion 22 is formed is blanked so as to form the first radially outward release hole 41. For example, as illustrated in FIG. 9A, the first radially outward release hole 41 that has an I shape when viewed in plan is blanked. This is carried out by integrally blanking the first portion 41a and a connecting portion 41b that is between a part in which the first flattened portion 14 is formed and a part in which the slot portion 22 is formed. The term "I shape" means a broad concept including the term "generally I shape". The term "integrally blanking" means blanking with the punch 211 that is formed integrally.

Figure 9B:
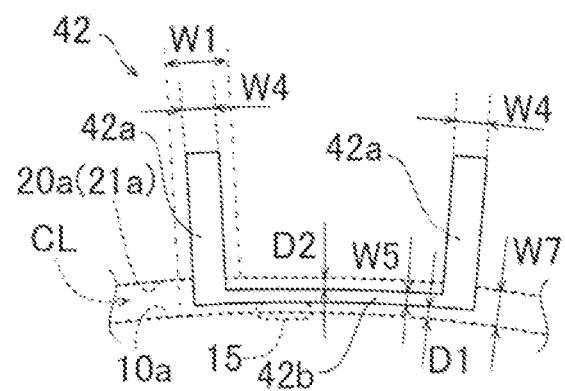

As illustrated in FIG. 8, in the first embodiment, at least a first portion 42a of a part of the electric steel plate 300 in which the slot portion 22 is formed is blanked so as to form the second radially outward release hole 42. For example, as illustrated in FIG. 9B, the second radially outward release hole 42 that has a U shape when viewed in plan is blanked. This is carried out by integrally blanking the first portion 42a and a connecting portion 42b that is between a part in which the second flattened portion 15 is formed and a part in which two adjacent slot portions 22 are formed. The "U shape" means a broad concept including a "generally U shape".

Here, the jump cut hole 17 is a hole in which a protruding portion of a clinch portion 18 described below is disposed.

The jump cut hole 17 is formed in the rotor plate member 1 that configures the end portion of the rotor core 10 (block core) in the stacking direction and is not formed in the other rotor plate members 1. The pilot hole is used as a hole to prescribe a position on the electric steel plate 300.

The first radially outward release hole 41 functions as a hole portion for releasing material that protrudes from the first flattened portion 14 (temporary hole for releasing material) when the first flattened portion 14 is formed. Here, the first flattened portion 14 is provided radially inward of and adjacent to the first radially outward release hole 41. The second radially outward release hole 42 functions as a hole portion for releasing material that protrudes from the second flattened portion 15 (temporary hole for releasing material) when the second flattened portion 15 is formed. Here, the second flattened portion 15 is provided radially inward of and adjacent to the second radially outward release hole 42. The center bridge one side release hole 51 functions as a release hole for when the third flattened portion 16 is formed.

As illustrated in FIG. 9A, the first radially outward release hole 41 is formed by integrally blanking the connecting portion 41b and the first portion 41a, while a width W2 of the first portion 41a of the first radially outward release hole 41 in the circumferential direction is larger than a width W3 of the connecting portion 41b in the radial direction. As illustrated in FIG. 9B, the second radially outward release hole 42 is formed by integrally blanking the connecting portion 42b and the first portion 42a, while a width W4 of the first portion 42a of the second radially outward release hole 42 in the circumferential direction is larger than a width W5 of the connecting portion 42b in the radial direction.

In the first embodiment, the second radially outward release hole 42 is formed so that the width W5 of the connecting portion 42b is equal to or more than 0.4 mm and equal to or less than 0.7 mm. The first radially outward release hole 41 is formed so that the width W3 of the connecting portion 41b is equal to or more than 0.4 mm and equal to or less than 0.7 mm, similar to the connecting portion 42b. The rotor core 10 and the stator core 20 are formed so that a width W7 of the clearance CL in the radial direction is larger than the width W5 and so that the width W7 is equal to or more than 0.6 mm and equal to or less than 0.9 mm. The width W7 is set based on the integration of the accuracy of each component of the rotary electric machine 100. That is, the connecting portion 42b is equal to or more than 0.4 mm and equal to or less than 0.7 mm, where the value 0.7 mm is obtained by subtracting, from 0.9 mm, an allowance on both sides in the radial direction (0.1 mm×2). The rotor core 10 is formed so that the length of a distance D1 in the radial direction between the outer peripheral surface 10a of the rotor core 10 and the connecting portion 42b is less than the width W5 and so that the distance D1 is equal to or more than 0.1 mm and equal to or less than 0.2 mm. The stator core 20 is formed so that a length of a distance D2 in the radial direction between the inner peripheral surface 20a of the stator core 20 (a distal end surface 21a of the teeth portion 21) and the connecting portion 42b is less than the width W5 and so that the distance D2 is equal to or more than 0.1 mm and equal to or less than 0.2 mm. That is, the second radially outward release hole 42 is formed while a part for blanking (parts of the distances D1 and D2) is ensured, which is the result of the relationship between the width W5 and the distance D1 and the relationship between the width W5 and the distance D2. It is preferable that the distances D1 and D2 be equal to or more than the thickness t2 of the electric steel plate 300.

In the first embodiment, the first radially outward release hole 41 and the second radially outward release hole 42 are blanked, as illustrated in FIGS. 9A-9B. Here, the first radially outward release hole 41 includes the first portion 41a that has the width W2 in the circumferential direction that is smaller than the width W1 of the slot portion 22 in the circumferential direction. The second radially outward release hole 42 includes the first portion 42a that has the width W4 in the circumferential direction that is smaller than the width W1 of the slot portion 22 in the circumferential direction.

Figure 10:
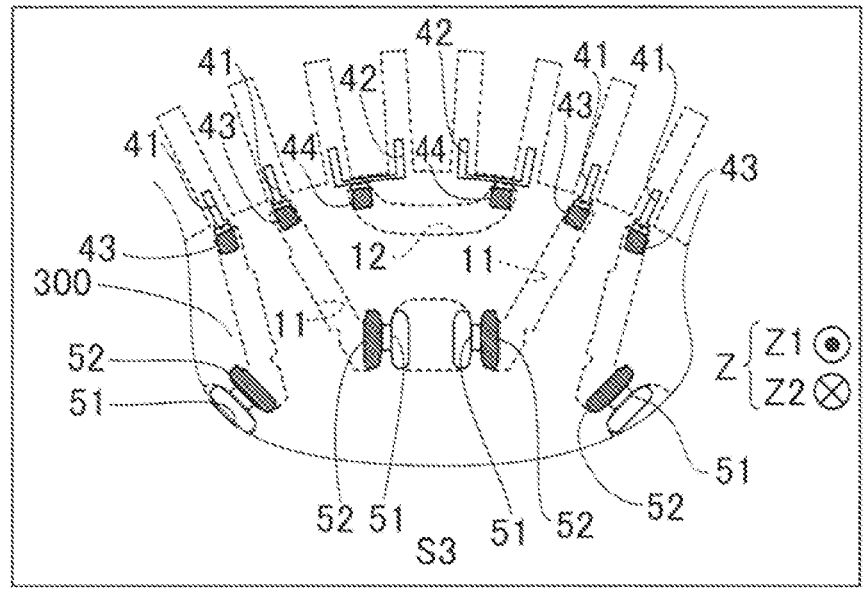
FIG. 10 illustrates a step of forming a first radially inward release portion and a second radially inward release portion according to the first embodiment of the disclosure.

As illustrated in FIG. 10, a first radially inward release hole 43, a second radially inward release hole 44, and a center bridge other side release hole 52 are blanked from the electric steel plate 300 at the same time in step S3. Specifically, in the first embodiment, the punch 211 is moved in the arrow Z2 direction so as to blank the electric steel plate 300 in the arrow Z2 direction, as illustrated in FIG. 6B. In this way, the electric steel plate 300 is sheared in the arrow Z2 direction so as to form the first radially inward release hole 43 and the second radially inward release hole 44. With steps S1 to S3, the bridge portions are formed. The first radially inward release hole 43 and the second radially inward release hole 44 are examples of a "rotor side release hole" and a "rotor side hole portion" in the embodiments.

Here, the first radially inward release hole 43 is a part of a region in which the first magnet hole portion 11 is formed and the second radially inward release hole 44 is a part of a region in which the second magnet hole portion 12 is formed. The first radially inward release hole 43 functions as a hole portion for releasing material that protrudes from the first flattened portion 14 when the first flattened portion 14 is formed. Here, the first flattened portion 14 is provided radially outward of and adjacent to the first radially inward release hole 43. The second radially inward release hole 44 functions as a hole portion for releasing material that protrudes from the second flattened portion 15 when the second flattened portion 15 is formed. Here, the second flattened portion 15 is provided radially outward of and adjacent to the second radially inward release hole 44. The center bridge other side release hole 52 functions as a release hole for when the third flattened portion 16 is formed.

Figure 11:
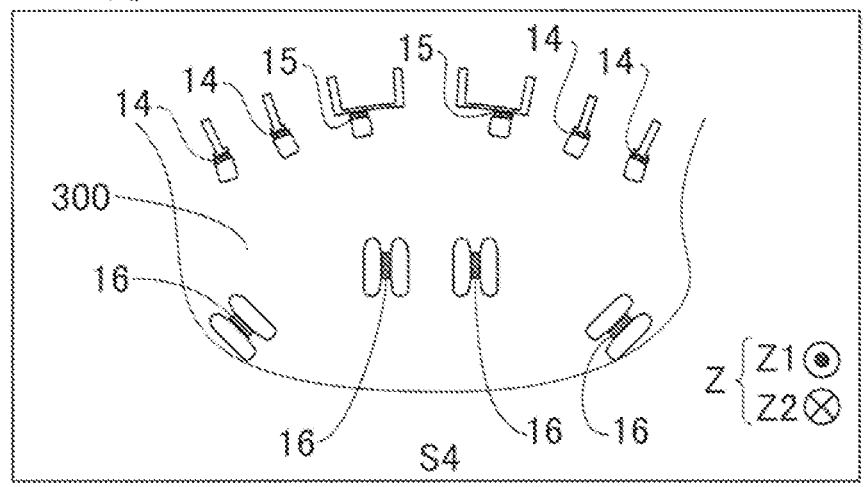
FIG. 11 illustrates a step of forming the first flattened portion, the second flattened portion, and the third flattened portion according to the first embodiment of the disclosure.

As illustrated in FIG. 11, the first flattened portion 14, the second flattened portion 15, and the third flattened portion 16 are formed on the electric steel plate 300 in step S4. In the first embodiment, the first flattened portion 14 is formed between the first radially outward release hole 41 and the first radially inward release hole 43 and is formed so that a thickness of the part that becomes a portion of the outer peripheral surface 10a in the radial direction of the rotor core 10 of the electric steel plate 300 is decreased from t2 to t1. In the first embodiment, the second flattened portion 15 is formed between the second radially outward release hole 42 and the second radially inward release hole 44 and is formed so that a thickness of the part that becomes a portion of the outer peripheral surface 10a in the radial direction of the rotor core 10 of the electric steel plate 300 is decreased from t2 to t1. The third flattened portion 16 is formed between the center bridge one side release hole 51 and the center bridge other side release hole 52.

Specifically, as illustrated in FIG. 4, the first flattened portion 14, the second flattened portion 15, and the third flattened portion 16 are formed by performing coining work with the punches 211 and the dies 221.

Figure 12:
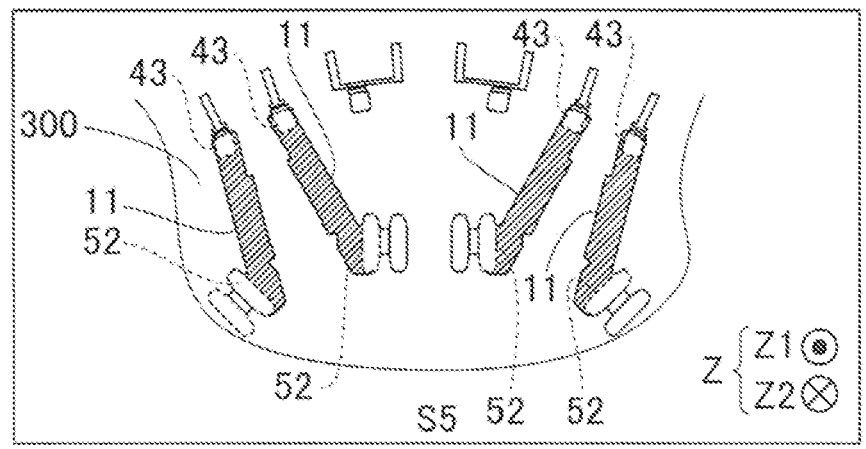
FIG. 12 illustrates a step of forming a first magnet hole portion according to the first embodiment of the disclosure.

As illustrated in FIG. 12, in step S5, the first magnet hole portion 11 is blanked from the electric steel plate 300. Specifically, a region including the first radially inward release hole 43 and the center bridge other side release hole 52 is blanked so as to form the first magnet hole portion 11.

Figure 13:
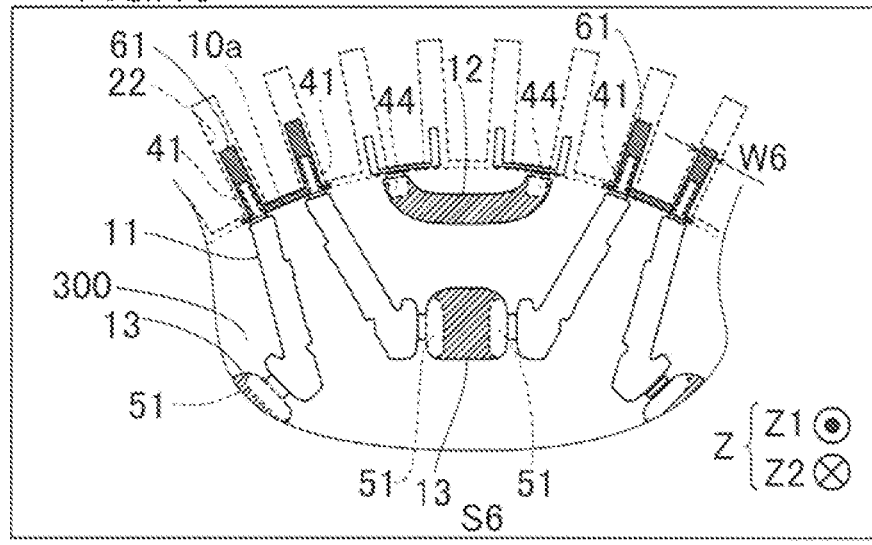
FIG. 13 illustrates a step of forming a second portion and a second magnet hole portion according to the first embodiment.

As illustrated in FIG. 13, in step S6, the second magnet hole portion 12, a second portion 61, a shaft hole 19 (see FIG. 1), and the magnetic flux anti-leak hole portion 13 are blanked from the electric steel plate 300. Specifically, a region across two second radially inward release holes 44 is blanked so as to form the second magnet hole portion 12. A region across two release holes 51 on one side of the center bridge is also blanked so as to form the magnetic flux anti-leak hole portion 13.

Here, in the first embodiment, the second portion 61 that includes the first radially outward release hole 41 and that is at least a part of a portion of the electric steel plate 300 in which the slot portion 22 is blanked from the electric steel plate 300. This is carried out before the step of blanking the outer radius (outer peripheral surface 10a) of the rotor core 10 (step S8) described below. As illustrated in FIG. 13, it is preferable that the second portion 61 be integrally blanked, in which the second portion 61 is at least a part of a portion in which a plurality (for example, two) of the slot portions 22 are formed.

Specifically, the second portion 61 has a generally U shape when viewed in the Z direction. In detail, the second portion 61 includes a part between the first radially outward release holes 41 that are adjacent to each other (a portion corresponding to an air gap) and the second portion 61 is a part that covers the surroundings of the first radially outward release hole 41. The width W6 is smaller than the width W1 of the slot portion 22 in the circumferential direction and is larger than the width W1 of the first portion 41a in the circumferential direction. Here, the width W6 is a width in the circumferential direction of a part that corresponds to the part of the second portion 61 in which the slot portion 22 is formed. That is, there is enough material left in the slot portion 22 to an extent in which it is possible to prevent scraps from floating when performing finish blanking of the slot portion 22.

The second portion 61 includes a part of the outer peripheral surface 10a of the rotor core 10. While a part of the outer peripheral surface 10a of the rotor core 10 is formed by blanking the second portion 61, the rotor plate member 1 itself is not blanked in this step. When forming the second portion 61, the punch 211 is moved in the arrow Z2 direction so as to blank the electric steel plate 300 in the arrow Z2 direction. In this way, the electric steel plate 300 is sheared in the arrow Z2 direction so as to form the second portion 61.

Figure 14:
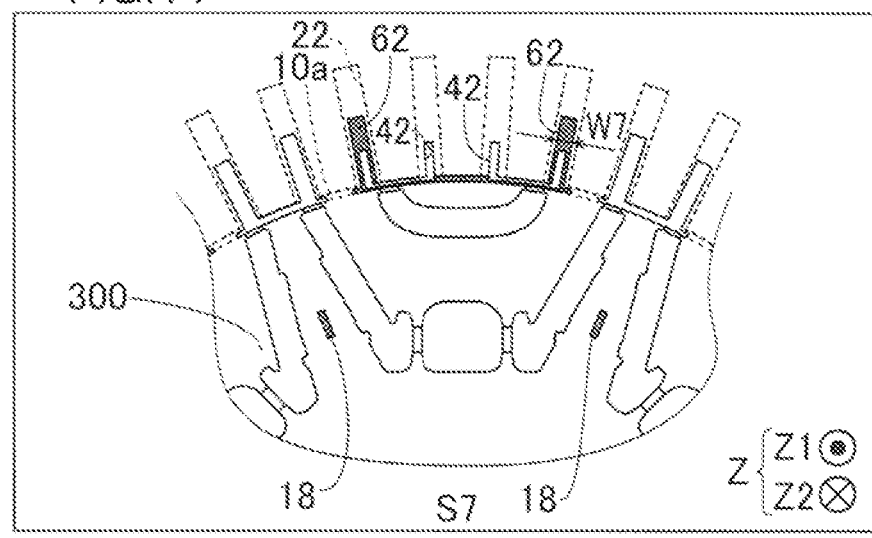
FIG. 14 illustrates a step of forming the second portion according to the first embodiment of the disclosure.

As illustrated in FIG. 14, in step S7, a second portion 62 is blanked from the electric steel plate 300 and the clinch portion 18 is processed so as to be formed. The second portion 62, in detail, is blanked from the electric steel plate 300, the second portion 62 including the second radially outward release hole 42 and being at least a part of a portion of the electric steel plate 300 in which the slot portion 22 is formed. It is preferable that the second portion 62 that is at least a part of a portion in which the plurality (for example, two) of the slot portions 22 disposed so as to be spaced away from each other are formed be integrally blanked. For example, a region in which two slot portions 22 are formed is included between the slot portions 22, which correspond to the second portion 62, in the circumferential direction. When forming the second portion 62, the punch 211 is moved in the arrow Z2 direction so as to blank the electric steel plate 300 in the arrow Z2 direction. In this way, the electric steel plate 300 is sheared in the arrow Z2 direction so as to form the second portion 62.

The second portion 62 has a generally U shape when viewed in the Z direction. In detail, the second portion 62 includes a part (part that corresponds to an air gap) that is between the second radially outward release holes 42 adjacent to each other and that is on the radially inner side of the second radially outward release hole 42. Also in detail, the second portion 62 is a part of a portion that covers the surroundings of the second radially outward release hole 42. The width W7 is smaller than the width W1 of the slot portion 22 in the circumferential direction and is larger than the width W4 of the first portion 42a in the circumferential direction. Here, the width W7 is a width in the circumferential direction of a part that corresponds to the part of the second portion 62 in which the slot portion 22 is formed.

The second portion 62 includes a part of the outer peripheral surface 10a of the rotor core 10. While a part of the outer peripheral surface 10a of the rotor core 10 is formed by blanking the second portion 62, the rotor plate member 1 itself is not blanked in this step.

Figure 15:
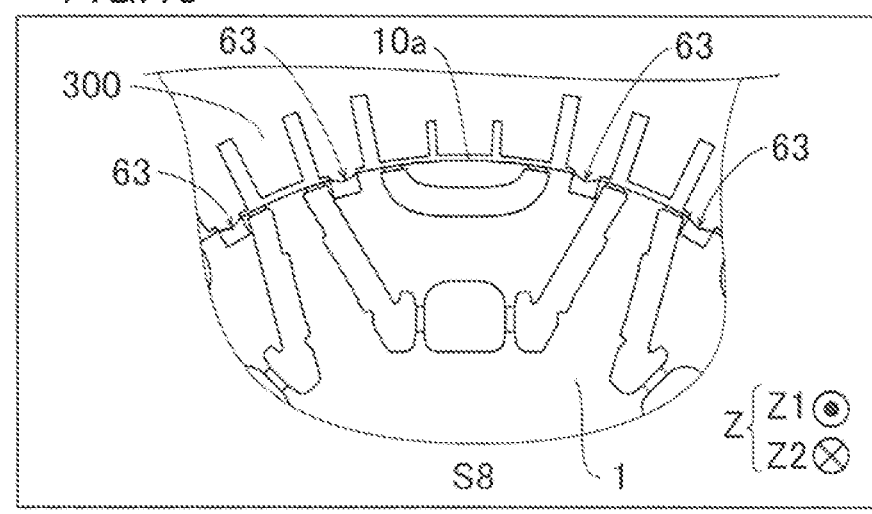
FIG. 15 illustrates a step of blanking the rotor plate member according to the first embodiment of the disclosure.

As illustrated in FIG. 15, in step S8, the rotor plate member 1 is blanked. In the first embodiment, the rotor plate member 1 is blanked from the electric steel plate 300 by cutting off a cut-off portion 63 that is a part, among the parts that are the outer peripheral surface 10a, different from the first radially outward release hole 41, the second radially outward release hole 42, and the second portions 61, 62. Specifically, as illustrated in FIG. 6C, the punch 211 is moved in the arrow Z1 direction so as to blank the electric steel plate 300 in the arrow Z1 direction. In this way, the rotor plate member 1 is sheared in the arrow Z2 direction so as to form the rotor plate member 1. The rotor core 10 is formed by stacking the blanked rotor plate members 1. The cut-off portion 63 is an example of "a portion from which a portion that becomes the outer periphery of the rotor core is cut off" in the claims.

Figure 16:
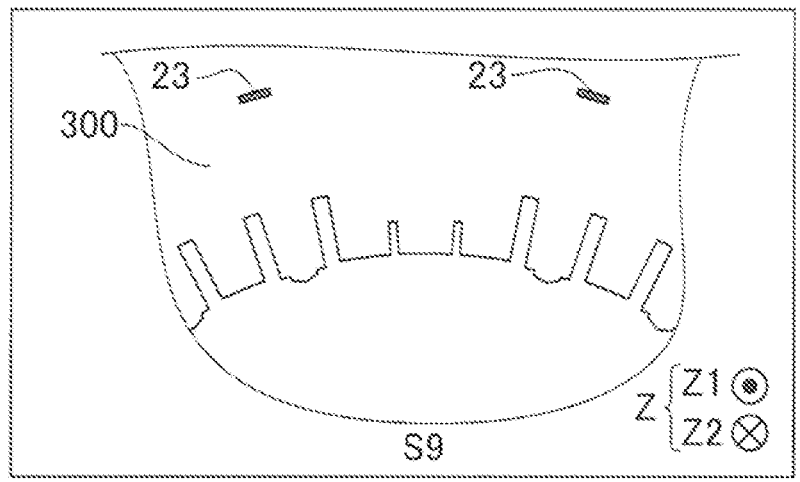
FIG. 16 illustrates a step of forming a jump cut hole according to the first embodiment of the disclosure.
Figure 17:
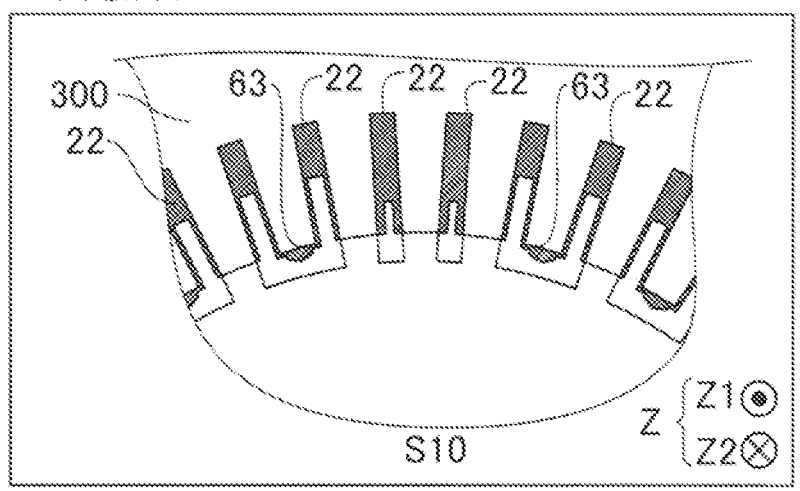
FIG. 17 illustrates a step of forming a slot portion according to the first embodiment of the disclosure.

As illustrated in FIG. 16, in step S9, the jump cut hole 23 is blanked from the electric steel plate 300. As illustrated in FIG. 17, in step S10, the slot portion 22 is blanked from the electric steel plate 300. In the first embodiment, after the step of blanking the rotor plate member 1 from the electric steel plate 300, the slot portions 22 and the cut-off portion 63 are integrally blanked so as to form the slot portion 22. For example, the cut-off portion 63 and two slot portions 22 that are adjacent to the cut-off portion 63 in the circumferential direction are integrally blanked from the electric steel plate 300.

Figure 18:
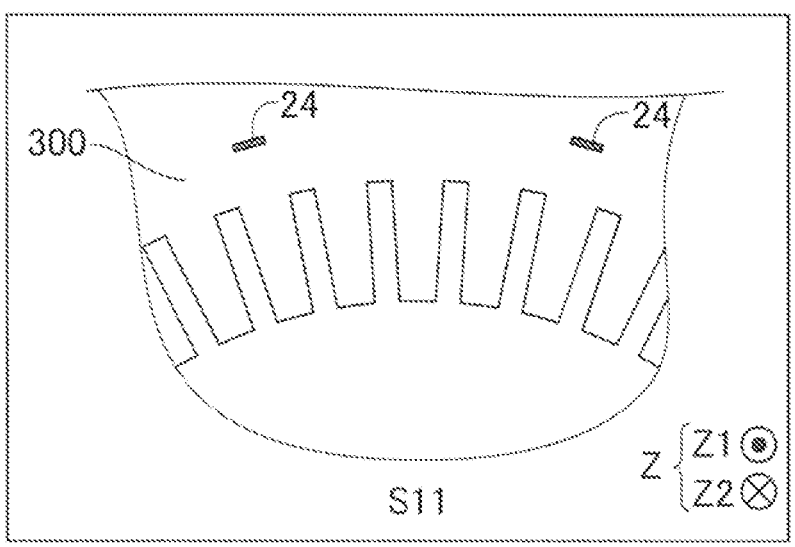
FIG. 18 illustrates a step of forming a clinch portion according to the first embodiment of the disclosure.
Figure 19:
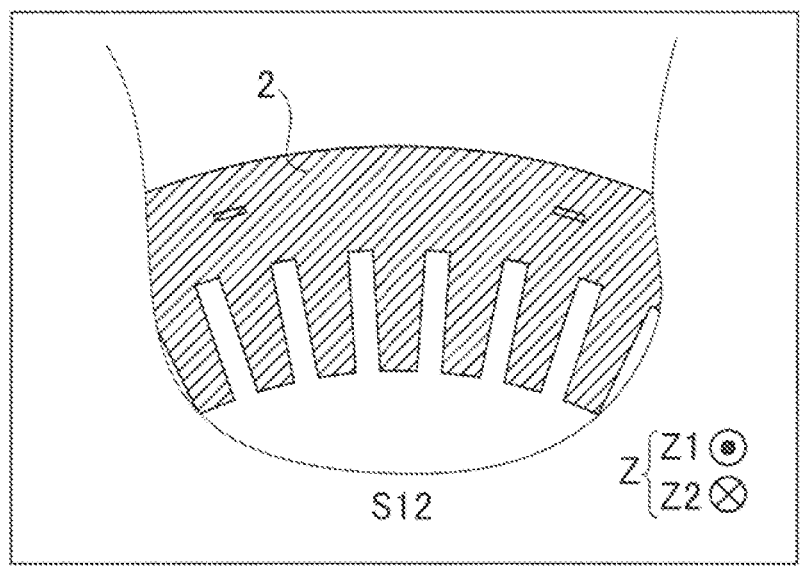
FIG. 19 illustrates a step of blanking the stator plate member according to the first embodiment of the disclosure.

As illustrated in FIG. 18, in step S11, the clinch portion 24 is processed and the ear hole 25 (see FIG. 1) is blanked from the electric steel plate 300. As illustrated in FIG. 19, in step S12, the stator plate member 2 is blanked from the electric steel plate 300. The stator core 20 is formed by stacking the stator plate members 2.

As illustrated in FIG. 3, the permanent magnet 30 is then disposed in the rotor core 10 so as to form the rotor 101. The coil is disposed in the stator core 20 so as to form the stator 102. As illustrated in FIG. 1, the rotor 101 and the stator 102 are assembled so as to manufacture the rotary electric machine 100.

Second Embodiment

Next, the manufacturing method of the rotor core 10 and the stator core 20 according to a second embodiment will be described with reference to FIGS. 20A and 20B. The rotor core 10 and the stator core 20 that are manufactured by the manufacturing method according to the second embodiment have the same configurations as the rotor core 10 and the stator core 20 according to the first embodiment. In the manufacturing method according to the second embodiment, steps S101, S102 are performed instead of steps S1, S2 according to the manufacturing method of the first embodiment. Components that are the same as those in the first embodiment are given the same signs to omit description.

Figure 20A:
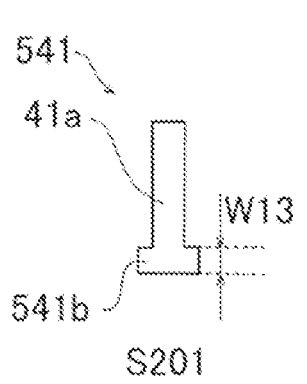
FIGS. 20A and 20B illustrate a configuration of a first radially outward release hole (FIG. 20A) and a second radially outward release hole (FIG. 20B) according to the second embodiment of the disclosure.

As illustrated in FIG. 20A, in step S101, a first radially outward release hole 541 is blanked. A connecting portion 541b and the first portion 41a are integrally blanked as the first radially outward release hole 541. As illustrated in FIG. 20B, in step S102, a second radially outward release hole 542 is blanked at the same time. A connecting portion 542b and the first portion 42a are integrally blanked as the second radially outward release hole 542. The first radially outward release hole 541 and the second radially outward release hole 542 are examples of a "stator side hole portion" in the embodiments.

Figure 20B:
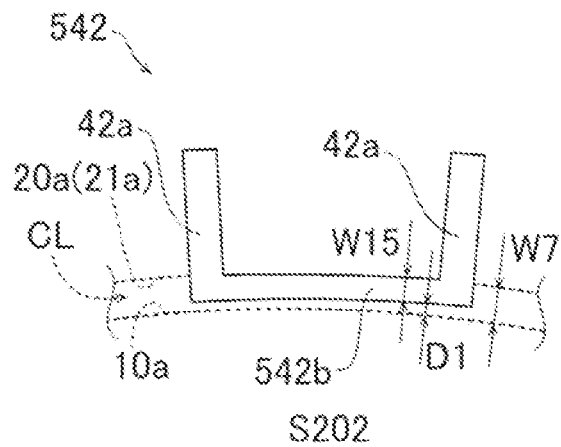

In the second embodiment, as illustrated in FIG. 20B, the second radially outward release hole 542 is formed so that a width W15 of the connecting portion 542b is equal to or more than 0.4 mm and equal to or less than 0.8 mm. The first radially outward release hole 541 is formed so that a width W13 of the connecting portion 541b is equal to or more than 0.4 mm and equal to or less than 0.8 mm, similar to the connecting portion 542b. That is, the connecting portion 542b is equal to or more than 0.4 mm and equal to or less than 0.8 mm, where the value 0.8 mm is obtained by subtracting, from 0.9 mm, an allowance (0.1 mm) on the radially inner side. The rotor core 10 and the stator core 20 are formed so that the width of the clearance CL in the radial direction is W7 and so that the width of the clearance CL in the radial direction is equal to or more than 0.6 mm and equal to or less than 0.9 mm. The rotor core 10 is formed so that the length of a distance D11 in the radial direction between the outer peripheral surface 10a of the rotor core 10 and the connecting portion 542b is less than the width W15 and so that the distance D11 is equal to or more than 0.1 mm and equal to or less than 0.2 mm. The stator core 20 is formed so that a length of a distance D12 in the radial direction between the inner peripheral surface 20a of the stator core 20 (the distal end surface 21a of the teeth 21) and the connecting portion 42b is generally zero mm. That is, in the second embodiment, in step S102, finish blanking is performed on the distal end surface 21a of some teeth 21 among the plurality of teeth 21. The other manufacturing steps (steps S3 to S12) according to the second embodiment are similar to those of the first embodiment.

Third Embodiment

Next, the manufacturing method of the rotor core 10 and the stator core 20 according to the third embodiment will be described with reference to FIG. 21. The rotor core 10 and the stator core 20 that are manufactured by the manufacturing method according to the third embodiment have the same configuration as the rotor core 10 and the stator core 20 according to the first embodiment. In the manufacturing method according to the third embodiment, step S203 is performed instead of steps S3, S5 according to the manufacturing method of the first embodiment. Components that are the same as those in the first and second embodiments are given the same signs to omit description.

Figure 21:
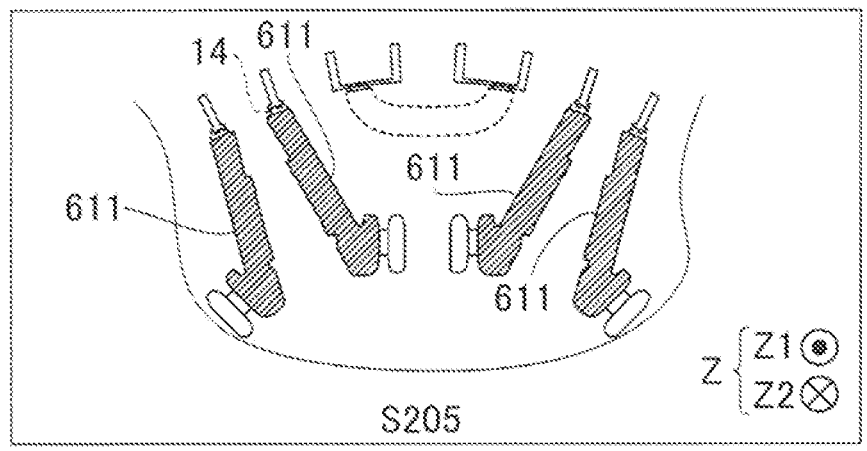
FIG. 21 illustrates a step of forming a rotor side hole portion according to the third embodiment of the disclosure.
Figure 22:
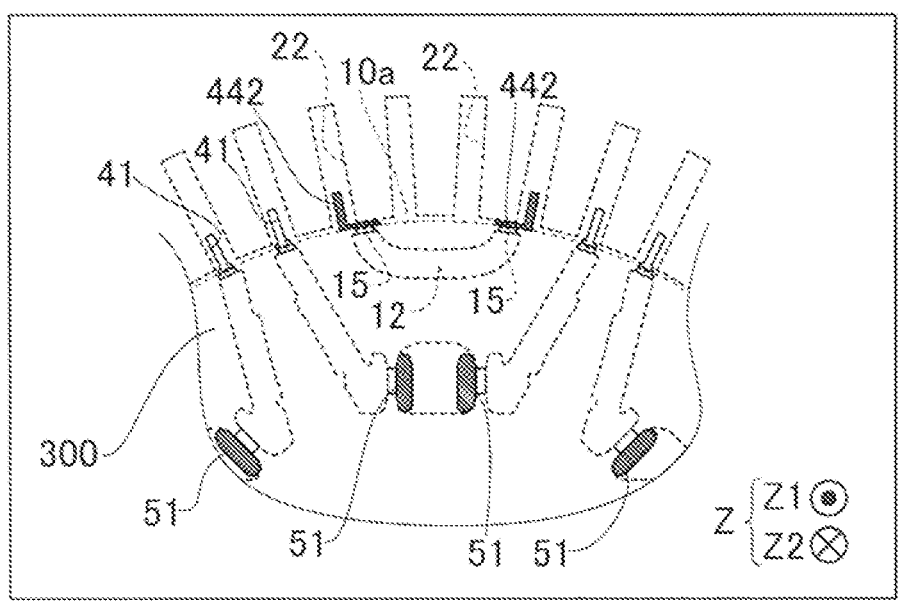
FIG. 22 illustrates a step of forming a second radially outward release hole according to a first modification of the first to third embodiments of the disclosure.

As illustrated in FIG. 21, in step S203, a rotor side hole portion 611 is blanked. Here, the rotor side hole portion 611 is not simply formed as a release hole (temporary hole), but also configures the first magnet hole portion 11 after a flattened portion 14 is formed. That is, in step S203 according to the third embodiment, the product shape of the first magnet hole portion 11 is formed with the material of the first flattened portion 14 being released to the rotor side hole portion 611, unlike step S5 according to the first embodiment, in which finish blanking is performed on the first magnet hole portion 11 after the step of forming the first flattened portion 14 (step S4). The other manufacturing steps (steps S1 (S101), S2 (S102), S4, and S6 to S12) according to the third embodiment are similar to those of the first or second embodiment.

Effects of First to Third Embodiments

In the first to third embodiments, the following effects can be obtained.

In the first to third embodiments, the stator side hole portion (41, 42, 541, 542) is formed in at least the first portion (41a, 42a) among the parts of the electric steel plate (300) in which the slot portion (22) is formed. In this way, since the width (W1) of the slot portion (22) is larger than the width of the air gap (CL) between the rotor core (10) and the stator core (20), it is possible to form the stator side hole portion (41, 42, 541, 542) having a larger width, compared to the case in which the stator side hole portion (41, 42, 541, 542) is formed only at a position corresponding to the air gap (CL). As a result, even when the bridge portion (14, 15) is formed on the outer periphery of the rotor plate member (1), it is possible to ensure the strength of the punch (211) for blanking the stator side hole portion (41, 42, 541, 542). In the first to third embodiments, since the rotor plate member (1) and the stator plate member (2) are formed by blanking the electric steel plate (300), composite molding of the rotor plate member (1) and the stator plate member (2) from the same electric steel plate (300) is possible. As a result, it is possible to ensure the strength of the punch (211) for forming the hole portion on both sides of the bridge portion in the radial direction while enabling composite molding of the stator plate member (2) and the rotor plate member (1) that has the bridge portion (14, 15) on the outer periphery (10a). It is possible to accurately form the bridge portion (14, 15) by providing the hole portion (41, 42, 43, 44, 541, 542) on both sides of the bridge portion (14, 15) in the radial direction.

In the first to third embodiments, the step of forming the stator side hole portion (41, 42, 541, 542) is a step of forming the stator side hole portion (41, 42, 541, 542) by blanking the electric steel plate (300) in the first direction (arrow Z2 direction) so as to shear the electric steel plate (300) in the first direction (arrow Z2 direction). Also in the first to third embodiments, the step of forming rotor side hole portion (43, 44) is a step of forming the rotor side hole portion (43, 44) by blanking the electric steel plate (300) in the first direction (arrow Z2 direction) so as to shear the electric steel plate (300) in the first direction (arrow Z2 direction). With such a configuration, a shearing direction (arrow Z2 direction) of the stator side hole portion (41, 42, 541, 542) side that is the radially outer side of the bridge portion (14, 15) and a shearing direction (arrow Z2 direction) of the rotor side hole portion (43, 44) side that is the radially inner side of the bridge portion (14, 15) are the same. It is thus possible to prevent stress from being generated in a direction in which the bridge portion (14, 15) is twisted and prevent the bridge portion (14, 15) from being deformed.

In the first to third embodiments, the step of forming the rotor plate member (1) is a step of forming the rotor plate member (1) by blanking the electric steel plate (300) in the second direction (arrow Z1 direction) that is the opposite direction to the first direction (arrow Z2 direction) so as to shear the rotor plate member (1) in the first direction (arrow Z1 direction). With such a configuration, the shearing direction (arrow Z2 direction) of the outer periphery (10a) of the rotor plate member (1) is similar to the shearing direction (arrow Z2 direction) on the stator side hole portion (41, 42, 541, 542) side that is the outer radial side of the bridge portion (14, 15). It is thus possible to further prevent stress from being generated in a direction in which the bride portion (14, 15) is twisted and further prevent the bridge portion (14, 15) from being deformed.

In the first to third embodiments, the step of forming the stator side hole portion (41, 42, 541, 542) is a step of forming the stator side hole portion (41, 42, 541, 542) by integrally blanking the first portion (41a, 42a) and the connecting portion (41b, 42b, 541b, 542b) between the part in which the bridge portion (14, 15) is formed and the part in which the slot portion (22) is formed. With such a configuration, even when the part in which the bridge portion (14, 15) is formed is provided at the position that is spaced away from the part in which the slot portion (22) is formed, it is possible to form the stator side hole portion (41, 42, 541, 542) while ensuring the strength of the punch (211) that performs integral blanking. This is made possible by integrally blanking the first portion (41a, 42a) and the connecting portion (41b, 42b, 541b, 542b) that connects the parts that are spaced away.

In the first to third embodiments, the step of forming the stator side hole portion (41, 42, 541, 542) is the step of forming the stator side hole portion (41, 42, 541, 542) by integrally blanking the connecting portion (41b, 42b, 541b, 542b) and the first portion (41a, 42a) so that the connecting portion (41b, 42b, 541b, 542b) and the first portion (41a, 42a) have at least one of a U shape, an L shape, or an I shape when viewed in plan. With such a configuration, strength against eccentric load can be improved, since the radial length (an area of a blanking portion) of the punch (211) for forming the stator side hole portion can be increased by blanking the connecting portion (41b, 42b, 541b, 542b) and the first portion (41a, 42a) in a U shape, an L shape, or an I shape. It is possible to prevent the configuration of the punch (211) for forming the hole portion on both sides of the bridge portion (14, 15) in the radial direction from being complex while ensuring the strength of the punch (211), since there is no need to configure the punch (211) to have a relatively complex shape by the I-shape blanking.

In the first to third embodiments, the step of forming the stator side hole portion (41, 42, 541, 542) is the step of forming the stator side hole portion (41, 42, 541, 542) by integrally blanking the connecting portion (41b, 42b, 541b, 542b) and the first portion (41a, 42a) while the width (W2, W4) of the first portion (41a, 42a) in the circumferential direction is larger than the width (W3, W5) of the connecting portion (41b, 42b, 541b, 542b) in the radial direction. With such a configuration, for example, even when the width (W3, W5) of the connecting portion (41b, 42b, 541b, 542b) in the radial direction is relatively small due to the connecting portion (41b, 42b, 541b, 542b) being provided at the position corresponding to the air gap (CL), it is possible to further ensure the strength of the punch (211) for forming the hole portion of the bridge portion (14, 15) since the width (W2, W4) of the bridge portion (14, 15) in the circumferential direction is relatively large.

In the second and third embodiments, the step of forming the stator side hole portion (541, 542) is a step of forming the stator side hole portion (541, 542) so that the width (W13, W15) of the connecting portion (541b, 542b) in the radial direction is equal to or more than 0.4 mm and equal to or less than 0.8 mm. With such a configuration, it is possible to improve the rigidity of the punch (211), unlike the case in which the width (W13, W15) of the connecting portion (541b, 542b) in the radial direction is less than 0.4 mm. It is possible to improve finish blanking workability on the rotor outer peripheral surface (10a) of the bridge portion (14, 15) after the step of forming the bridge portion (14, 15), unlike the case in which the width (W13, W15) of the connecting portion (541b, 542b) in the radial direction is larger than 0.8 mm. That is, it is possible to form an allowance between the rotor outer peripheral surface (10a) and the connecting portion (541b, 542b). It is thus possible to improve finish blanking workability on the rotor outer peripheral surface (10a) while improving the rigidity of the punch (211).

In the first and third embodiments, the step of forming the stator side hole portion (41, 42) is a step of forming the stator side hole portion (41, 42) so that the width (W3, W5) of the connecting portion (41b, 42b) in the radial direction is equal to or more than 0.4 mm and equal to or less than 0.7 mm. With such a configuration, it is possible to improve the rigidity of the punch (211), unlike the case in which the width (W3, W5) of the connecting portion (41b, 42b) in the radial direction is less than 0.4 mm. It is possible to improve blanking workability on both sides, that is, the outer peripheral surface (10a) of the rotor core (10) of the bridge portion (14, 15) after the step of forming the bridge portion (14, 15) and the distal end surface (21a) of the teeth (21), unlike the case in which the width (W3, W5) of the connecting portion (41b, 42b) in the radial direction is larger than 0.7 mm. That is, with such a configuration, it is possible to improve blanking workability since allowances (blanking margins) (parts of D1 and D2) can be left between the connecting portion (41b, 42b) and the outer peripheral surface (10a) and between the connecting portion (41b, 42b) and the distal end surface (21a). As a result, it is possible to improve finish blanking workability on both sides in the radial direction, that is, on the outer peripheral surface (10a) of the rotor core (10) and on the distal end surface (21a) of the teeth (21), while improving the rigidity of the punch (211).

In the first to third embodiments, the step of forming the stator side hole portion (41, 42, 541, 542) is a step of forming the stator side hole portion (41, 42, 541, 542) in the first portion (41a, 42a) that has the width (W2, W4) that is smaller than the width (W1) of the slot portion (22) in the circumferential direction. With such a configuration, it is possible to ensure the width of the slot portion (22) to be blanked in the circumferential direction when blanking the slot portion (22) after blanking the first portion (41a, 42a). It is thus possible to prevent scrap floating when blanking the slot portion (22). The term "scrap floating" means the phenomenon in which the blanking scrap that is blanked returns upward from the die hole.

The first to third embodiments further include the step of blanking the second portion (61, 62) after the step of forming the stator side hole portion (41, 42, 541, 542) and before the step of forming the rotor plate member (1). The second portion (61, 62) includes the stator side hole portion (41, 42, 541, 542) and is at least a part of a portion of the electric steel plate (300) in which the slot portion (22) is formed. Here, in the configuration where the second portion is blanked after the step of forming the rotor plate member, the second portion having a relatively small width and not being supported by the region corresponding to the rotor plate member remains in the electric steel plate after the stator side hole portion and the rotor plate member are blanked. If the second portion is blanked in this state, it is conceivable that scrap floating is easily generated. In contrast, in the first to third embodiments, the second portion (61, 62) is blanked after the step of forming the stator side hole portion (41, 42, 541, 542) and before the step of forming the rotor plate member (1). It is thus possible to blank the second portion (61, 62) while the portion corresponding to the rotor plate member (1) remains in the electric steel plate (300). As a result, the second portion (61, 62) can be blanked while the second portion (61, 62) is supported by the portion that corresponds to the rotor plate member (1). It is thus possible to prevent scrap floating when the second portion (61, 62) is blanked.

In the first to third embodiments, the step of blanking the second portion (61, 62) is the step of integrally blanking the second portion (61, 62) that is at least a part of the portion in which the slot portions (22) are formed. With such a configuration, the size of the punch (211) can be increased, compared to the case of blanking only the second portion of the portion in which one slot portion is formed. It is thus possible to further ensure the strength of the punch (211) for forming the hole portion on both sides of the bridge portion (14, 15) in the radial direction.

In the first to third embodiments, the step of forming the rotor plate member (1) and the stator plate member (2) is the step of blanking the stator plate member (2) from the electric steel plate (300), after blanking the rotor plate member (1) from the electric steel plate (300) by cutting off the portion, which is different from the stator side hole portion (41, 42, 541, 542) and the second portion (61, 62), of the electric steel plate (300) that becomes the outer periphery (10a) of the rotor core (10), after the step of blanking the second portion (61, 62). With such a configuration, the rotor plate member (1) and the stator plate member (2) can be individually blanked even when the second portion (61, 62) is blanked before the rotor plate member (1) is blanked, since the rotor plate member (1) and the stator plate member (2) are blanked after the second portion (61, 62) is blanked.

In the first to third embodiments, the step of forming the rotor plate member (1) and the stator plate member (2) is the step of blanking the stator plate member (2) from the electric steel plate (300) after forming the slot portion (22) by integrally blanking the slot portions (22) and the portion (63) from which the portion that becomes the outer periphery (10a) of the rotor core (10) is cut off, after the step of blanking the rotor plate member (1) from the electric steel plate (300). With such a configuration, in the portion (63) from which the portion that becomes the outer periphery (10a) of the rotor core (10) is cut off and in the slot portion (22) after the first portion (41a, 42a) is blanked, the width of the portion to be blanked is relatively small. It is thus possible to prevent scrap floating while ensuring the strength of the punch (211) for forming the hole portion of the bridge portion (14, 15) on both sides in the radial direction by integrally blanking the slot portions (22) and the portion (63) from which the portion that becomes the outer periphery (10a) of the rotor core (10) is cut off

[Modification]

The embodiments disclosed herein should be conceived as exemplary and non-limiting in all respects. The scope of the disclosure is defined by the scope of the claims, rather than the description of the embodiments, and includes all changes (modifications) that fall within the meaning and scope of equivalents of the claims.

For example, in the embodiment described above, an example is shown in which the rotor is configured as a so-called inner rotor, the rotor core being disposed radially inward of the stator core. However, the disclosure is not limited to this. That is, the rotor may be configured as an outer rotor by disposing the rotor core radially outward of the stator core.

In the embodiment described above, an example is shown in which a first radially outward release portion is blanked in an I shape and a second radially outward release portion is blanked in a U shape. However, the disclosure is not limited to this. For example, as in the manufacturing method of a first modification illustrated in FIG. 22, the second radially outward release portion 442 may be blanked in an L shape when viewed in plan. By forming the second radially outward release portion (442) in an L shape, it is possible to ensure the strength of the punch (211) even when the circumferential position of the second bridge portion (15) and the circumferential position of the slot portion (22) are disposed at different positions.

In the embodiment described above, an example is shown in which the first radially inward release hole and the second radially inward release hole are formed at the portion that becomes the first magnet hole portion or the second magnet hole portion. However, the disclosure is not limited to this. For example, the first radially inward release portion and the second radially inward release portion may be formed at a portion that becomes the hole portion for suppressing leakage of magnetic flux.

In the embodiment described above, an example is shown in which the slot portion is formed so as to have a constant width in the circumferential direction. However, the disclosure is not limited to this. For example, the slot portion may be formed so that the width in the circumferential direction gradually increases toward the rotor core side.

In the embodiment described above, examples of values such as the width W3 (W13) and the width W5 (W15) are indicated. However, the disclosure is not limited to this. That is, a preferable example is indicated in the embodiment described above. The width W3 (W13), the width W5 (W15) etc. may be configured to have values other than those described above.

Figure 23:
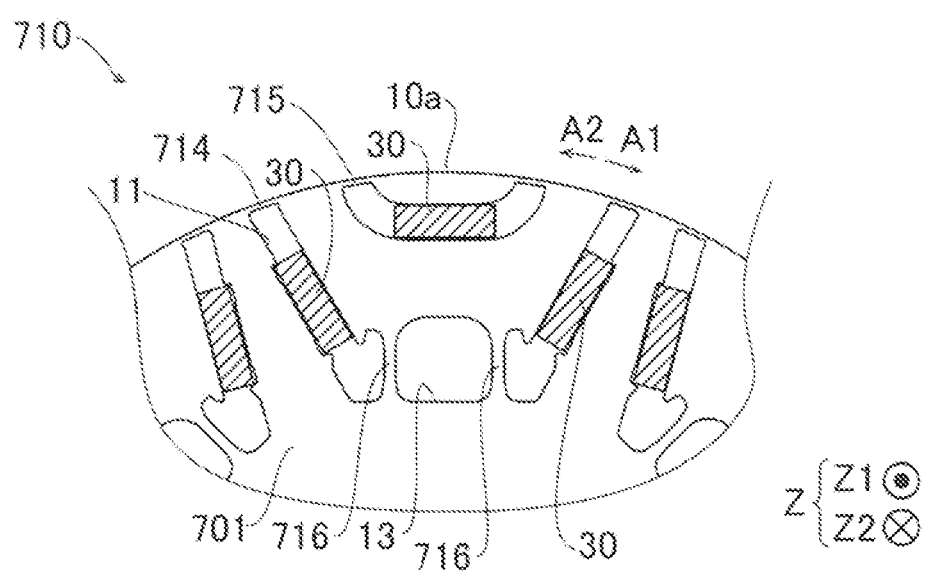
FIG. 23 illustrates a configuration of a rotor according to a second modification of the first to third embodiments of the disclosure.

In the embodiment described above, an example is shown in which the bridge portion is configured as the first flattened portion or the second flattened portion. However, the disclosure is not limited to this. For example, as with a rotor core 710 according to a second modification illustrated in FIG. 23, a first bridge portion 714, a second bridge portion 715, and a third bridge portion 716 to which coining work is not performed may be provided at positions corresponding to the first flattened portion 14, the second flattened portion 15, and the third flattened portion 16 (see FIG. 3) according to the first embodiment. In this case, the manufacturing process of the rotor core 710 is not provided with step S4 (see FIG. 11), which is the step of forming the thinning portion. Also in this case, the first radially outward release hole and the second radially outward release hole are the first radially outward hole portion and the second radially outward hole portion, respectively, and the first radially inward release hole and the second radially inward release hole are the first radially inward hole portion and the second radially inward hole portion, respectively.

In the embodiment described above, an example is shown in which, as the step for forming the bridge portion, the first radially inward release hole (first radially inward hole portion) and the second radially inward release hole (second radially inward hole portion) (S3, S203) are formed after the first radially outward release hole (S1, S101) and the second radially outward release hole (S2, S102) are formed. However, the invention is not limited to this. That is, as the step for forming the bridge portion, the first radially outward release hole and the second radially outward release hole may be formed after the first radially inward release hole (first radially inward hole portion) and the second radially inward release hole (second radially inward hole portion) are formed. Alternatively, the first radially inward release hole (first radially inward hole portion) and the second radially inward release hole (second radially inward hole portion) may be formed at the same time as the first radially outward release hole and the second radially outward release hole.

The invention claimed is:

1. A manufacturing method of a core for a rotary electric machine comprising the steps of:
    forming a rotor core by stacking a plurality of rotor plate members each having a hole portion;
    forming a stator core by stacking a plurality of stator plate members each having a slot portion,
    wherein in the forming of the rotor core and the stator core, each rotor plate member of the plurality of rotor plate members, and each stator plate member of the plurality of stator plate members are formed by a method comprising;
    forming a bridge portion including forming a stator side hole portion in at least a first portion of a portion of an electric steel plate in which the slot portion is to be formed, and forming a rotor side hole portion in at least a part of a portion of the electric steel plate radially adjacent the stator side hole portion; and
    forming a corresponding one of each of the rotor plate members and each of the stator plate members by blanking the electric steel plate, after the forming the bridge portion,
    wherein the corresponding rotor plate member formed includes the bridge portion, and the corresponding stator plate member formed includes the slot portion obtained after the blanking from a same piece of the electric steel plate.

2. The manufacturing method of a core for a rotary electric machine according to claim 1, wherein
    the forming the stator side hole portion comprises forming the stator side hole portion by blanking the electric steel plate in a first direction so as to shear the electric steel plate in the first direction, and
    the forming the rotor side hole portion comprises forming the rotor side hole portion by blanking the electric steel plate in the first direction so as to shear the electric steel plate in the first direction.

3. The manufacturing method of a core for a rotary electric machine according to claim 2, wherein the forming the rotor plate member comprises forming the rotor plate member by blanking the electric steel plate in a second direction that is an opposite direction to the first direction so as to shear the rotor plate member in the first direction.

4. The manufacturing method of a core for a rotary electric machine according to claim 3, wherein the forming the stator side hole portion comprises forming the stator side hole portion by integrally blanking the first portion and a connecting portion between a portion in which the bridge portion is formed and a portion in which the slot portion is formed.

5. The manufacturing method of a core for a rotary electric machine according to claim 4, wherein the forming the stator side hole portion comprises forming the stator side hole portion by integrally blanking the connecting portion and the first portion so that the connecting portion and the first portion have at least one shape of a U shape, an L shape, or an I shape when viewed in plan.

6. The manufacturing method of a core for a rotary electric machine according to claim 2, wherein the forming the stator side hole portion comprises forming the stator side hole portion by integrally blanking the first portion and a connecting portion between a portion in which the bridge portion is formed and a portion in which the slot portion is formed.

7. The manufacturing method of a core for a rotary electric machine according to claim 6, wherein the forming the stator side hole portion comprises forming the stator side hole portion by integrally blanking the connecting portion and the first portion so that the connecting portion and the first portion have at least one shape of a U shape, an L shape, or an I shape when viewed in plan.

8. The manufacturing method of a core for a rotary electric machine according to claim 6, wherein the forming the stator side hole portion comprises s forming the stator side hole portion by integrally blanking the connecting portion and the first portion while a width of the first portion in a circumferential direction is larger than a width of the connecting portion in a radial direction.

9. The manufacturing method of a core for a rotary electric machine according to claim 8, wherein the forming the stator side hole portion comprises forming the stator side hole portion so that the width of the connecting portion in the radial direction is equal to or more than 0.4 mm and equal to or less than 0.8 mm.

10. The manufacturing method of a core for a rotary electric machine according to claim 1, wherein the forming the stator side hole portion comprises forming the stator side hole portion by integrally blanking the first portion and a connecting portion between a portion in which the bridge portion is formed and a portion in which the slot portion is formed.

11. The manufacturing method of a core for a rotary electric machine according to claim 10, wherein the forming the stator side hole portion comprises forming the stator side hole portion by integrally blanking the connecting portion and the first portion so that the connecting portion and the first portion have at least one shape of a U shape, an L shape, or an I shape when viewed in plan.

12. The manufacturing method of a core for a rotary electric machine according to claim 11, wherein the forming the stator side hole portion comprises forming the stator side hole portion so that the width of the connecting portion in the radial direction is equal to or more than 0.4 mm and equal to or less than 0.8 mm.

13. The manufacturing method of a core for a rotary electric machine according to claim 10, wherein the forming the stator side hole portion comprises forming the stator side hole portion so that the width of the connecting portion in the radial direction is equal to or more than 0.4 mm and equal to or less than 0.8 mm.

14. The manufacturing method of a core for a rotary electric machine according to claim 13, wherein the forming the stator side hole portion comprises forming the stator side hole portion so that the width of the connecting portion in the radial direction is equal to or more than 0.4 mm and equal to or less than 0.7 mm.

15. The manufacturing method of a core for a rotary electric machine according to claim 1, wherein the forming the stator side hole portion comprises forming the stator side hole portion in the first portion having a width in the circumferential direction that is smaller than a width of the slot portion in the circumferential direction.

16. The manufacturing method of a core for a rotary electric machine according to claim 1, wherein the method forming each rotor plate member and each stator plate member further comprises blanking a second portion of the electric steel plate after the forming the stator side hole portion and before the forming the rotor plate member, the second portion including the stator side hole portion and being at least a part of a portion of the electric steel plate in which the slot portion is formed.

17. The manufacturing method of a core for a rotary electric machine according to claim 16, wherein the blanking the second portion comprises integrally blanking the second portion that is at least a part of a portion in which a plurality of the slot portions are formed.

18. The manufacturing method of a core for a rotary electric machine according to claim 17, wherein the forming the rotor plate member and the stator plate member comprises blanking the stator plate member from the electric steel plate after blanking the rotor plate member from the electric steel plate by cutting off a portion, which is different from the stator side hole portion and the second portion, of the electric steel plate that becomes an outer periphery of the rotor core, after the step of blanking the second portion.

19. The manufacturing method of a core for a rotary electric machine according to claim 16, wherein the forming the rotor plate member and the stator plate member comprises blanking the stator plate member from the electric steel plate after blanking the rotor plate member from the electric steel plate by cutting off a portion, which is different from the stator side hole portion and the second portion, of the electric steel plate that becomes an outer periphery of the rotor core, after the step of blanking the second portion.

20. The manufacturing method of a core for a rotary electric machine according to claim 19, wherein the forming the rotor plate member and the stator plate member comprises blanking the stator plate member from the electric steel plate after forming the slot portion by integrally blanking the slot portions and a portion from which the portion that becomes the outer periphery of the rotor core is cut off, after the step of blanking the rotor plate member from the electric steel plate.

\* \* \* \* \*